June 18, 1946.  C. M. HINES  2,402,403
ELECTRIC DECELEROMETER
Original Filed Jan. 30, 1942
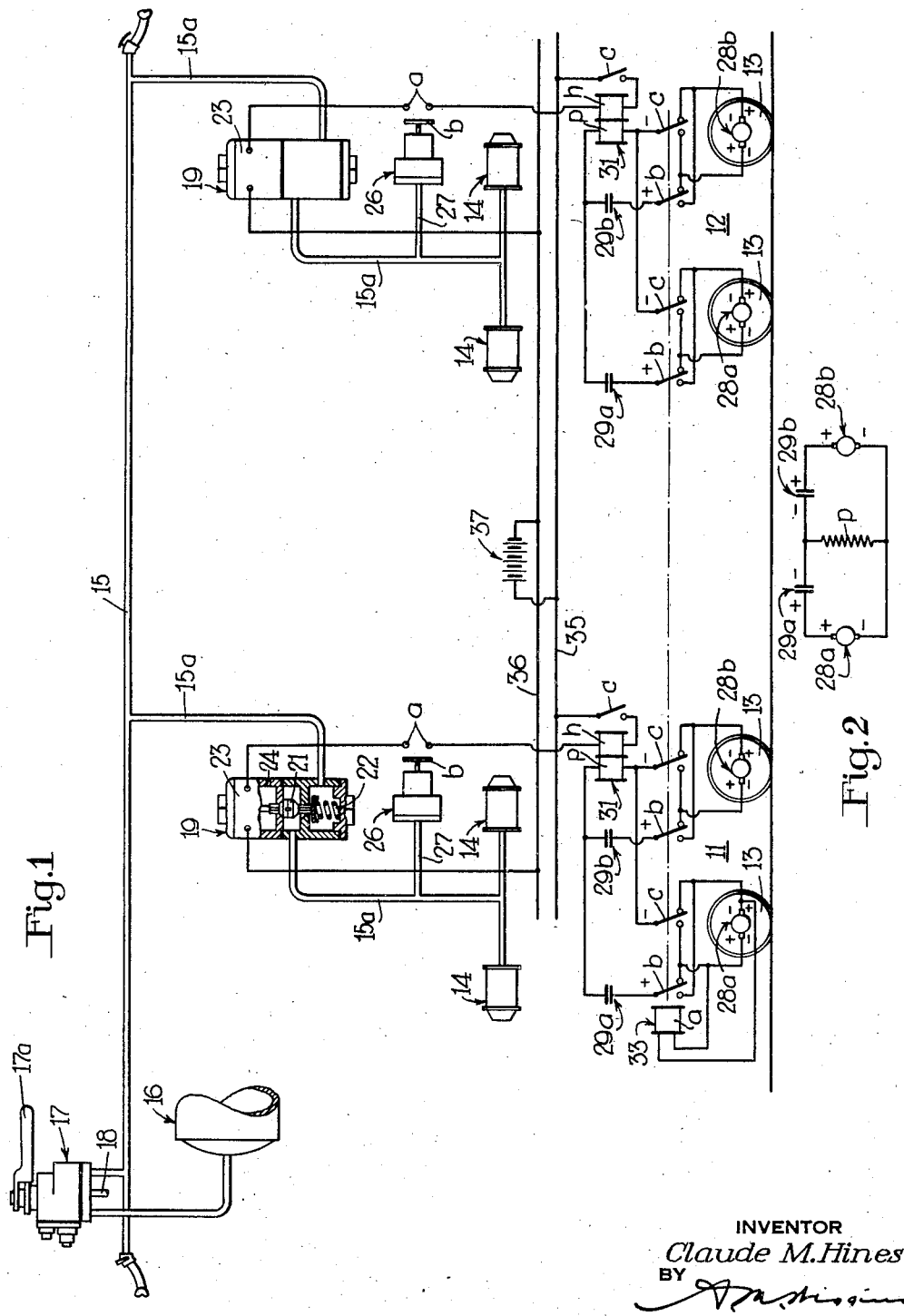
INVENTOR
Claude M. Hines
BY
ATTORNEY Patented June 18, 1946

2,402,403

UNITED STATES PATENT OFFICE 2,402,403

ELECTRIC DECELEROMETER

Claude M. Hines, Pittsburgh, Pa., assignor to The Westinghouse Air Brake Company, Wilmerding, Pa., a corporation of Pennsylvania Original application January 30, 1942, Serial No. 428,803. Divided and this application May 27, 1942, Serial No. 444,673

2 Claims. (Cl. 175—355)

This invention relates to electric decelerometers and has particular relation to electric decelerometers associated with one or more rotary elements, the present application being a division of my prior application Serial No. 428,803, filed January 30, 1942, now Patent 2,329,761, assigned to the assignee of the present application.

Electric decelerometer apparatus of the type having a direct-current generator driven according to the speed of rotation of a rotary element, such as a vehicle wheel or axle, and providing a voltage substantially proportional to the rotational speed of the rotary element together with a circuit connected to the terminals of the generator including in series relation a condenser and the winding of a relay has been previously proposed in Patent 2,092,366 to Baughman and my prior Patent 2,208,738. In my prior patent, when the voltage of the generator increases due to acceleration of the vehicle wheels, the condenser is charged and the winding of the relay is energized by a current flowing in one certain direction and proportional to the rate of increase of voltage and consequently the rate of rotative acceleration of the vehicle wheels. When the voltage of the generator decreases due to deceleration of the vehicle wheels, the condenser discharges a current in the reverse direction through the circuit substantially proportional to the rate of rotative deceleration of the wheels. The design of the relay winding is such as to cause an operative response of the relay only when the winding is energized by current discharged from the condenser and exceeding a certain value corresponding to a slipping rate of deceleration of the vehicle wheel.

The term "slipping rate of deceleration" refers to a rate of deceleration occurring only when the wheel is in a slipping condition. In the present application a wheel is said to be in a slipping condition when it rotates at a speed less than a speed corresponding to a vehicle speed at a given instant, although the term "slipping condition" may also be employed to refer to rotation of a vehicle wheel at a speed greater than that corresponding to the speed of the vehicle at a given instant. The slipping condition of the vehicle wheel occurs due to the degree of brake application exceeding the limit of adhesion between the wheel and road surface or rail. When a wheel begins to slip, it decelerates at an abnormally rapid rate which is not attained while the wheel is not slipping. The rotative deceleration of a wheel at a slipping rate is therefore positive indication of the slipping condition. The electric decelerometer apparatus in my prior Patent 2,208,738 is employed to detect the slipping condition of vehicle wheels for the purpose of controlling the brakes in a manner to prevent the wheels from sliding. To this end suitable control apparatus is provided in association with the decelerometer apparatus for rapidly reducing the degree of the brake application when slipping of the wheels is initiated.

My present invention is adapted for the same use in a vehicle brake control system as the apparatus disclosed in the prior Patent 2,208,738. It is, however, adaptable to other situations and for other purposes than the control of the brakes of a vehicle. For example, it may be used in every situation where a plurality of rotary elements normally rotate at the same speed and it is desired to indicate or register the asynchronous condition of the two rotary elements for a desired purpose.

In previous apparatus, such as that shown in my prior Patent 2,208,738, the decelerometer apparatus is duplicated for each rotary element or wheel unit, two or more of the decelerometer devices being arranged in parallel for controlling the same brake control device or devices.

It is an object of my present invention to provide an arrangement whereby complete duplication of the decelerometer apparatus for each rotary element or wheel unit is unnecessary, this object being accomplished by providing an arrangement coordinating and combining the decelerometer apparatus for a plurality of rotary elements in a manner to permit the employment of a single relay for the purpose of registering a predetermined rate of deceleration of any one or all of a plurality of rotary elements. The electric decelerometer apparatus constituting my present invention accordingly results in simplification and reduction in cost of the apparatus as compared to previous decelerometer apparatus of the same type.

The above object and other objects of my invention which will be made apparent hereinafter are attained by means of apparatus subsequently to be described and shown in the accompanying drawing wherein Fig. 1 is a simplified diagrammatic view, showing my improved electric decelerometer apparatus employed in connection with the fluid pressure brake control equipment for the wheels of a railway car and Fig. 2 is a simplified or equivalent circuit diagram representing the essential relation of parts of my improved electric decelerometer apparatus included in the system shown in Fig. 1.

Description

While my improved electric decelerometer apparatus may be employed, as previously stated, in connection with any apparatus in which it is desired to register a predetermined rate or rotative deceleration of any one of a plurality of rotary elements, it is illustrated and described herein particularly and by way of illustration in connection with a fluid pressure brake control apparatus.

Referring to Fig. 1, a simplified fluid pressure brake control apparatus of the familiar straight-air type is illustratively shown in connection with two wheel trucks 11 and 12 of a single car. Each of the wheel trucks comprises two wheel units, each unit including a pair of wheels 13 fixed at opposite ends of a connecting axle. Only one wheel of each wheel unit is shown for simplicity in the drawing. Although employed herein to designate a pair of axle-connected wheels, the term "wheel unit" may refer to a single wheel or any other number of connected wheels.

The brakes associated with the wheels 13 may be of any suitable type such as the conventional clasp-arranged shoes engaging the rim of the wheel and operated through the medium of brake levers or rigging in response to the supply of fluid under pressure to and the release of fluid under pressure from brake cylinders 14. Although any suitable number of brake cylinders may be provided, one brake cylinder is shown for each wheel unit in substantially vertical alignment above the corresponding unit.

In practice, fluid under pressure is supplied to the brake cylinders to effect application of the brakes and released from the brake cylinders to effect release of the brakes under the control of the operator by conventional fluid pressure brake control apparatus of well-known type. I have illustrated a simplified form of brake control apparatus of the straight-air type including a train pipe, hereinafter referred to as the control pipe 15, a source of supply of fluid under pressure hereinafter referred to as the main reservoir 16 and a brake valve 17 of the self-lapping type.

The brake valve 17 is of the well-known type described in detail and claimed in Patent 2,042,112 of Ewing K. Lynn and Rankin J. Bush and is therefore shown only in outline form and will here be but briefly described.

Brake valve 17 comprises suitable self-lapping valve mechanism having a rotary operating shaft to which an operating handle 17a is fixed. In the normal or brake release position of the brake valve handle 17a, fluid under pressure is exhausted from the control pipe 15 to atmosphere through an exhaust port and pipe 18 at the brake valve. Upon displacement of the brake valve handle in a horizontal plane out of its brake release position into its so-called application zone, the exhaust communication just mentioned is closed and a supply communication is established through which fluid under pressure is supplied from the main reservoir 16 to the control pipe 15. The nature of the self-lapping valve mechanism of the brake valve 17 is such that the pressure established in the control pipe 15 is substantially proportional to the degree of displacement of the brake valve handle out of its brake release position. The valve mechanism of the brake valve 17, moreover, possesses a pressure-maintaining feature of maintaining a pressure in the control pipe 15 corresponding to the position of the brake valve handle in the event that the pressure in the control pipe tends to reduce for any reason such as leakage.

The brake cylinders 14 for each of the wheel trucks are connected by corresponding branch pipes 15a to the control pipe 15, each of the branch pipes 15a having a magnet valve 19 interposed therein for a purpose hereinafter to be described.

Each magnet valve 19 is of a conventional double beat type having a double beat valve 21 which is biased to an upper seated position by a coil spring 22 and actuated to a lower seated position in response to energization of a magnet winding or solenoid 23.

In its upper seated position, the double beat valve 21 establishes communication through the corresponding branch pipe 15a from the control pipe 15 to the corresponding brake cylinders 14. In its lower seated position, the double beat valve 21 closes communication through the branch pipe 15a and establishes communication whereby fluid under pressure is exhausted from the corresponding brake cylinders through an exhaust port 24 at a rapid rate.

It will thus be seen that as long as the magnet winding 23 of the magnet valve 19 is deenergized, the pressure in the corresponding brake cylinders 14 may be increased and decreased in accordance with the increase and decrease of pressure in the control pipe 15 under the control of the operator. When the magnet winding 23 of the magnet valve 19 is energized, the pressure in the brake cylinders 14 is rapidly reduced independently of the pressure in the control pipe 15.

A pressure responsive switch device 26 is provided for each wheel truck and is connected by a pipe 27 to the branch pipe 15a at a point between the brake cylinders and the magnet valve 19 so as to be subject at all times to the pressure in the brake cylinders 14.

The pressure switches 26 are preferably of a snap-acting type, such as shown in Patent 2,096,492, to Ellis E. Hewitt. Briefly, each pressure switch 26 comprises a pair of stationary insulated contacts $a$ and a movable contact $b$. As long as the pressure in the brake cylinders 14 is less than a certain value, such as fifteen pounds per square inch, the movable contact $b$ is actuated to its open position out of engagement with the associated contacts $a$. When the pressure in the brake cylinders 14 increases above fifteen pounds per square inch, the contact $b$ is actuated by snap-action into a closed position engaging the associated contacts $a$ and remains in such position as long as the brake cylinder pressure exceeds fifteen pounds per square inch. When the pressure in the brake cylinders reduces below fifteen pounds per square inch again, the contact $b$ is actuated by snap-action to its open position out of engagement with its associated contacts $a$. The purpose of the pressure switches 26 will be made apparent hereinafter.

According to my present invention, I provide electric decelerometer apparatus associated with the wheel units of each wheel truck for the purpose of controlling the magnet valve 19 for the corresponding wheel truck in a manner to cause it to effect a release of fluid under pressure from the brake cylinders in response to the inception of slipping of the wheels of that truck. The electric decelerometer apparatus comprises two direct-current generators 28a and 28b for each wheel truck, the generator 28a having its armature driven according to the rotation of one wheel unit and the generator 28b having its armature driven according to the rotation of the other wheel unit. Any desired arrangement for driving the armatures of the generators may be employed, for example, mounting the generators in the journal casing at the end of an axle and coupling the armature shaft of the generator in coaxial relation to the axle as indicated in the drawing.

The generators 28a and 28b may be of any suitable type adapted to produce a voltage substantially proportional to the rotational speed of the corresponding wheel unit. In the present instance it will be assumed that the generators 28a and 28b have permanent magnet steel cores, thereby eliminating the necessity for field windings. In a generator of this type, the polarity of the voltage at the terminals of the generator reverses automatically with the reversal in the direction of rotation of the armature for reasons well known.

The generators 28a and 28b of each of the wheel trucks are connected in cooperating circuit relation with two electrical condensers 29a and 29b and a relay 31.

The relays 31 are of the so-called uni-directional type having two separate windings p and h respectively and a single front contact c. Relays 31 are referred to as unidirectional relays because of the characteristic operation thereof, namely the operative response or pick-up thereof only in response to the flow of current exceeding a certain value through either winding p or h in one certain direction, the flow of current through the windings in the opposite direction being effective to restore the contact c to its dropped-out position or maintain it firmly in its dropped-out position if already in such position.

In order to insure the proper operation of the relays 31 notwithstanding a reversal of polarity of the voltage at the terminals of the generators 28a and 28b, any suitable reversing switch mechanism may be provided. For purposes of illustration, I have shown a reversing relay 33 of the polarized type having a winding a connected across the terminals of one of the generators, such as the generator 28a of truck 11 and a plurality of pairs of reversing contacts b and c, each pair of contacts being effective to reverse the connections to the terminals of the corresponding generator 28a or 28b.

For purposes of the present invention, it will be assumed that the polarity of the voltage at the terminals of the generators during the forward travel of the vehicle is such as to cause the contacts b and c of reversing relay 33 to be maintained in their dropped-out positions shown and that a reverse travel of the car causes contacts b and c of reversing relay 33 to be actuated to their respective picked-up positions. As usual in the case of polarized relays, the contacts of reversing relay 33 remain in the position to which they are last actuated, independently of continued energization of the winding of the relay, until the direction of current through the winding is reversed.

The fundamental or equivalent circuit for the electric decelerometer apparatus of each wheel truck is shown in Fig. 2, it being understood that the contacts of the reversing relay 33 are omitted from the circuit for simplicity. It will be apparent on Fig. 2 that the two generators 28a and 28b of each wheel truck are connected in opposing parallel relation to each other, the two condensers 29a and 29b being connected in series relation between the generator terminals of like polarity and the winding p of the relay 31 being connected at one end to the common terminals of the two condensers and at the other end to the remaining connected terminals of the two generators.

It will be apparent that when the vehicle or car is in motion, the condensers 29a and 29b are charged respectively to the voltage delivered by the corresponding generators 28a and 28b. The separate currents supplied to charge the two condensers both flow through the winding p of the relay 31. The current supplied to charge each of the condensers varies substantially in proportion to the rate of increase of the voltage delivered by the corresponding generator 28a or 28b. Being thus energized by current which is the summation of the charging currents of the two condensers 29a and 29b, it will be apparent that the current energizing the winding p is proportional to the rate of acceleration of the vehicle wheels 13 of the corresponding truck.

The connections of the winding p of relay 31 are such that the condenser charging current energizing the winding p flows in such a direction as to bias the contact c of the relay towards its dropped-out position. Accordingly, the relay 31 is not picked-up in response to acceleration of the vehicle.

When the vehicle decelerates, each of the condensers 29a and 29b discharges current through the winding p and the armature winding of the corresponding generators 28a or 28b, the current discharged being substantially proportional to the rate of reduction of the voltage at the terminals of the generators. The winding p of the relay 31 is accordingly energized by the summation of the currents separately discharged from the condensers 29a and 29b. In this instance, the current flows through the winding p in the proper direction to cause pick-up of the contact of the relay.

The winding p of relay 31 is so designed that as long as the car wheels 13 decelerate at a normal or non-slipping rate, for example a rate not exceeding four miles per hour per second, the current energizing the winding p of the relay 31 is insufficient to cause pick-up of the contact of the relay.

Whenever either one or both of the wheel units of a given truck begin to slip and accordingly decelerate at an abnormally rapid rate exceeding a certain rate, such as ten miles per hour per second, the summation of the separate currents discharged from the condensers 29a and 29b and energizing the winding p of the relay 31 exceeds that value required to cause pick-up of the contact of the relay and the contact is accordingly actuated to its picked-up position.

The winding h of relay 31 is a self-holding winding effective, when energized, to maintain the contact c of the relay in its picked-up position notwithstanding energization of the pick-up winding p by a condenser charging current, as when one or more slipping wheel units accelerates back toward vehicle speed. As will be apparent in Fig. 1, the winding h of each of the relays 31 is connected in series relation with the contact c of the corresponding relay 31, the contacts of the corresponding pressure switch 26, and the winding 23 of the corresponding magnet valve 19 across a pair of bus wires 35 and 36 that are connected respectively to positive and negative terminals of a suitable source of direct-current voltage, such as the storage battery 37.

It will thus be apparent that if the contacts of a pressure switch 26 are in closed position when the contact c of the relay 31 is picked-up, the winding h of the relay 31 and the winding 23 of the magnet valve 19 are energized. The winding h of the relay 31 is effective when energized to maintain the contact c in its picked-up or closed position as long as the circuit across the bus wires 35 and 36 remains closed. As will be apparent hereinafter, the energization of the magnet winding 23 of the magnet valve 19 causes reduction of the pressure in the brake cylinders and a consequent opening of the contacts of the pressure switch 26 which interrupts the holding circuit including the winding h of the relay 31.

Operation

Let it be assumed that the car is traveling under power with the brake valve handle 17a in its brake release position so that the brakes are released and that the operator desires to bring the car to a stop. To do so he first shuts off the propulsion power in the usual manner and then shifts the brake valve handle 17a out of its brake release position into its application zone an amount corresponding to the desired degree of brake application. The control pipe 15 and the brake cylinders 14 are thus charged to a corresponding pressure and the brakes are applied on the wheels to a corresponding degree.

As long as the wheels on the vehicle do not slip, no variation of the pressure in the brake cylinders 14 occurs except in accordance with variations of the pressure in the control pipe 15 effected under the control of the operator by means of the brake valve 17. If, however, when an application of the brakes is initiated or at any time during a brake application, one or more of the wheel units on the vehicle begin to slip, a further operation occurs which will now be described.

Let it be assumed that the wheels of the right-hand wheel unit of truck 11 begin to slip while the brakes are applied. In such case the voltage of the corresponding generator 28b rapidly reduces and the condenser 29b accordingly discharges a current through the winding p of the relay 31 to cause the contact c thereof to be actuated to its picked-up position.

The contact c of the relay 31 is effective in its picked-up position to establish the circuit, previously described, for energizing the holding winding h of relay 31 and the magnet winding 23 of the magnet valve 19 for wheel truck 11. The magnet valve 19 accordingly closes the communication through branch pipe 15a from the control pipe 15 to the brake cylinders 14 of the wheel truck 11 and causes fluid under pressure to be rapidly vented through the exhaust port 24 from the brake cylinders. The venting of fluid under pressure from the brake cylinders 14 continues until the pressure in the brake cylinders reduces below fifteen pounds per square inch. At such time, the movable contact b of pressure switch 26 is actuated to its open position thereby interrupting the circuit for energizing the holding winding h of relay 31 and the magnet winding 23 of magnet valve 19.

The reduction of the pressure in the brake cylinders 14 in response to the inception of the wheel-slip condition causes the slipping wheels to cease to decelerate and to accelerate back to a speed corresponding to vehicle speed without reducing in speed to a locked or sliding condition. Ordinarily the slipping wheels will be fully restored to vehicle speed before the contacts of the pressure switch 26 are restored to open position because the time required for the pressure in the brake cylinders to reduce sufficiently to cause the contacts of the pressure switch to open is longer than that required for the slipping wheels to be restored to vehicle speed. It will be obvious that the time contact c of relay 31 remains picked-up and the time that the magnet winding 23 of the magnet valve 19 is energized will vary with the fluid pressure in the brake cylinders at the time the slipping condition begins. However, in most instances, the magnet winding of the magnet valve 19 will not be deenergized and restored to its normal condition until after the slipping wheels are fully restored to vehicle speed.

The contact c of relay 31 is not restored to its dropped-out position in response to energization of pick-up winding p thereof by current supplied to charge condenser 29b in response to acceleration of the corresponding wheel unit back toward vehicle speed because holding winding h is energized by a current sufficient to maintain the contact c picked-up.

It will thus be apparent that when the magnet valve 19 is restored to its normal condition restoring the communication through branch pipe 15a from the control pipe 15 to the brake cylinders 14, the corresponding build-up of pressure in the brake cylinders 14, and consequent closure of the contacts of the pressure switch 26 will not be effective to reenergize the magnet winding of the magnet valve 19 because the contact c of the relay 31 will in the meantime have been restored to its dropped-out position due to the deenergization of the holding winding h of relay 31.

Fluid under pressure is thus again supplied from the control pipe 15 to the brake cylinders 14 to cause reapplication of the brakes to a degree corresponding to the pressure established in the control pipe 15. However, due to the pressure-maintaining feature of the brake valve 17, the pressure in the control pipe 15 is maintained at a pressure corresponding to the position of the brake valve handle.

If the wheels of the right-hand wheel unit of wheel truck 11 again begin to slip upon reapplication of the brakes, the above cycle of operation is repeated so that at no time are the wheels permitted to reduce in speed to a locked condition and slide.

If during a brake application, the wheels of the left-hand wheel unit of wheel truck 11 begin to slip while the wheels of the right-hand wheel unit do not, the winding p of the relay 31 is again energized sufficiently to cause pick-up of the contact c thereof due to the abnormal current discharged from the condenser 29a.

If both wheel units of truck 11 begin to slip when an application of the brakes is initiated or at any time during a brake application pick-up winding p is energized by the summation of currents discharged from the two condensers 29a and 29b and the relay 31 is thus picked-up in the same manner as when only one wheel unit begins to slip. When the slipping wheel units accelerate back toward vehicle speed in response to the release of the brakes caused by pick-up of relay 31, the current supplied to charge condensers 29a and 29b is not sufficient to overcome the effect of energizing the holding winding h. Consequently relay 31 does not drop-out until the pressure switch 26 opens to effect deenergization of the holding winding h.

It will thus be seen that the relay 31 is picked-up in response to the slipping of either one or both of the wheel units on truck 11 so that the degree of application of the brakes on the truck is substantially reduced and then automatically increased.

The operation of the decelerometer apparatus and the control of the brakes associated with the wheels of truck 12 is the same as that described for wheel truck 11 and is accordingly not repeated.

When the car comes to a stop, the relays 31 are always restored to their dropped-out position and consequently fluid under pressure is always supplied to the brake cylinders to maintain the brakes applied thereon. In order to start the car again, the operator must therefore restore the brake valve handle 17a to its brake release position to release the brakes.

If the car travels in a reverse direction, the contacts of reversing relay 33 are actuated to their picked-up position, thereby reversing the connections to the terminals of the generators 28a and 28b. It will thus be apparent that notwithstanding a reversal of polarity of the voltage at the terminals of the generators, the condensers are always subject to a charging voltage of uniform polarity so that the proper direction of flow of current through the winding p for pick-up of the relays 31 occurs in response to the deceleration of the vehicle wheels.

It will be understood that while I have shown the equipment comprising my invention applied only to a single car, such equipment may be employed on each car of a train. In the case of a train of cars, it is preferable to provide, in the usual and well-known manner, suitable magnet valves on each car electrically controlled, through train wires by a master controller on a car such as the locomotive at the head of the train for effecting simultaneous variations of pressure throughout the length of the control pipe 15.

Having now described my invention, what I claim as new and desire to secure by Letters Patent is:

1. Apparatus for detecting the slipping condition of any one of a plurality of separately rotatable vehicle wheel units, said apparatus comprising a plurality of voltage sources each effective to supply a direct-current voltage substantially proportional to the rotational speed of a corresponding one of said wheel units and of opposite polarity for opposite directions of rotation of the wheel unit, an electrical condenser for each of said voltage sources, an electrical relay having a pick-up winding, means connecting one of said voltage sources and a corresponding one of said condensers in series relation with said pick-up winding so as to cause a flow of current through the winding in one direction in response to the charging of the said one condenser upon acceleration and in the opposite direction in response to the discharging of said one condenser upon deceleration of the corresponding wheel unit, means connecting a different one of said voltage sources and a corresponding different one of said condensers in series relation with the said winding in such a manner as to cause a flow of current in the said one direction through the said pick-up winding in response to the charging of said different condenser due to acceleration and in said opposite direction in response to the discharging of said different condenser upon deceleration of the corresponding wheel unit, the arrangement being such that the separate charging and discharging currents of the several condensers are additively combined to cause energization of the pick-up winding by a current which is equal to the sum of the separate charging or discharging currents, the total current energizing the pick-up winding being insufficient to cause pick-up of the relay unless one or more of the wheel units decelerates at an abnormally high rate incidental to a slipping condition, and means controlling the connection between the several voltage sources and the corresponding condensers in a manner to maintain a uniform polarity of impressed voltage on the condensers notwithstanding a reversal of the polarity of the voltage supplied by the voltage sources.

2. Apparatus for detecting the slipping condition of any one of a plurality of separately rotatable vehicle wheel units, said apparatus comprising a plurality of voltage sources each effective to supply a direct-current voltage substantially proportional to the rotational speed of a corresponding one of said wheel units and of opposite polarity for opposite directions of rotation of the wheel unit, an electrical condenser for each of said voltage sources, an electrical relay having a pick-up winding, means connecting one of said voltage sources and a corresponding one of said condensers in series relation with said pick-up winding so as to cause a flow of current through the winding in one direction in response to the charging of the said one condenser upon acceleration and in the opposite direction in response to discharging of said one condenser upon deceleration of the corresponding wheel unit, means connecting a different one of said voltage sources and a corresponding different one of said condensers in series relation with the said winding in such a manner as to cause a flow of current in the said one direction through the said pick-up winding in response to the charging of said different condenser due to acceleration and in said opposite direction in response to discharging of said different condenser upon deceleration of the corresponding wheel unit, the arrangement being such that the separate charging and discharging currents of the several condensers are additively combined to cause energization of the pick-up winding by a current which is equal to the sum of the separate charging or discharging currents, the total current energizing the pick-up winding being insufficient to cause pick-up of the relay unless one or more of the wheel units decelerates at an abnormally high rate incidental to a slipping condition, and means responsive to the polarity of the voltage supplied by one of said voltage sources for controlling the connection between all of said voltage sources and the corresponding condensers in such a manner as to cause a uniform polarity of voltage to be impressed on said condensers notwithstanding a reversal of the polarity of the voltage supplied by the several voltage sources.

CLAUDE M. HINES.